United States Patent [19]
Tanaka et al.

[11] Patent Number: 4,837,651
[45] Date of Patent: Jun. 6, 1989

[54] DISC CARTRIDGE

[75] Inventors: Kimio Tanaka; Toshihiko Ishida; Haruo Shiba, all of Nagano, Japan

[73] Assignee: TDK Corporation, Japan

[21] Appl. No.: 942,492

[22] Filed: Dec. 16, 1986

[30] Foreign Application Priority Data

Dec. 18, 1985 [JP] Japan .............. 60-194554[U]

[51] Int. Cl.$^4$ .............................. G11B 23/03
[52] U.S. Cl. ........................................... 360/133
[58] Field of Search ................... 360/133; 206/444

[56] References Cited

U.S. PATENT DOCUMENTS

| | | | |
|---|---|---|---|
| 3,416,150 | 12/1968 | Lindberg | 360/133 X |
| 3,529,301 | 9/1970 | Hiruta | 360/133 X |
| 4,499,996 | 2/1985 | Coyle | 360/133 X |
| 4,692,831 | 9/1987 | Suzuki | 360/133 |

FOREIGN PATENT DOCUMENTS 0137965 4/1985 European Pat. Off. ............ 360/133

Primary Examiner—A. J. Heinz
Attorney, Agent, or Firm—Steinberg & Raskin

[57] ABSTRACT

A disc cartridge capable of preventing a recording surface section of a disc from being contacted by a casing and placing the disc at a proper position in the casing without damaging and polluting, to thereby ensure the safe and smooth operation of the disc in the casing. The disc cartridge includes a pair of disc receivers each of which is formed therein with a recess for receiving a peripheral portion of the disc. The recess has an end surface contacting an outer periphery of the disc, which is formed into a substantially sideways V-shape of which an apex is positioned at substantially a center of the end surface to position the outer periphery of the disc at the center of the end surface.

16 Claims, 5 Drawing Sheets

DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in recording and/or reproducing equipment.

Conventionally, its has been desirable to protect such a disc type recording carrier from environment because it is not only easy to be covered with dust and damaged but adversely affected due to a variation in temperature. For this purpose, the use of an envelope such as a tray, a casing or the like has been proposed to protect the disc. Unfortunately, such a conventional envelope is not suitable for the protection of a double-sided hard disc, because the the housing of the disc in a storage space defined in the envelope causes the disc to be contacted with the envelope. Also, the envelope causes the disc to be contacted with an inner surface thereof during the storage or transportation. Thus, the use of the envelope results in damage and/or pollution of the disc as well as the exposure of the disc to a variation in temperature. Further, when it is desired to support a photo-electromagnetic disc of the double sided type in the envelope through as outer periphery of the disc, the envelope contacts any obstacle formed at the outer periphery of the disc such as an undesired protrusion formed due to mismatching, burrs or the like to cause crushing of the obstacle and/or misregister between the disc and the envelope.

Accordingly, it would be highly desirable to provide a disc cartridge which, even when any obstacle is formed at an outer periphery of a disc, is capable of preventing a casing from being contacted by the obstacle to safety keep the disc in the casing and hold the disc at a proper position in the casing.

SUMMARY OF THE INVENTION

Briefly speaking, in accordance with the present invention, a disc cartridge is provided. The disc cartridge includes a casing comprising an upper cover plate and a lower cover plate joined together, in which a disc is rotatably housed. Also, the disc cartridge includes a shutter arranged to operate at least one window provided at the casing to insert a recording and/or reproducing head therethrough into the disc cartridge. The casing is provided therein with a pair of actuators each of which is adapted to releasably lock the shutter. The disc cartridge also includes a disc receiver which is arranged in the casing and operatively connected to the actuator to selectively receive therein a part of a peripheral portion of the disc. The actuator is arranged to be slidable in a longitudinal direction of the disc cartridge to cause the disc receiver to be approachably moved with respect to the disc. The disc receiver is formed with a sideways recess of which an end surface contacting with an outer periphery of the disc is formed into a sideways V-shape, so that the disc receiver may force the disc to a rear end of the casing while keeping it at substantially a center of the casing in a width direction of the casing when the shutter is actuated to close the window and be separated from the disc when the shutter is actuated to open the window.

Accordingly, it is an object of the present invention to provide a disc cartridge which is capable of constantly keeping a disc at a safe state in a casing.

It is another object of the present invention to provide a disc cartridge which is capable of constantly holding a disc at a proper position in a casing It is a further object of the present invention to provide a disc cartridge which, even when any obstacle is formed at an outer periphery of a disc, is capable of preventing a casing from being contacted by the obstacle to safely keep the disc in the casing and hold the disc at a proper position in the casing.

It is still another object of the present invention to provide a disc cartridge which is capable of safely housing a disc in a casing without damaging and polluting the disc.

It is yet another object of the present invention to provide a disc cartridge which is capable of ensuring the safety of a recording surface of a disc housed in a casing.

In is still a further object of the present invention to provide a disc cartridge which is capable of preventing the unsteadiness of a disc in a casing.

It is yet a further object of the present invention to provide a disc cartridge which is accomplishing the above-noted objects with a simple structure.

Still other objects and advantages of the invention will in part be clear and will in part be apparent from the specification.

BRIEF DESCRIPTION OF THE DRAWINGS

For a fuller understanding of the invention, reference is made to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompanying drawings.

Figure 1:
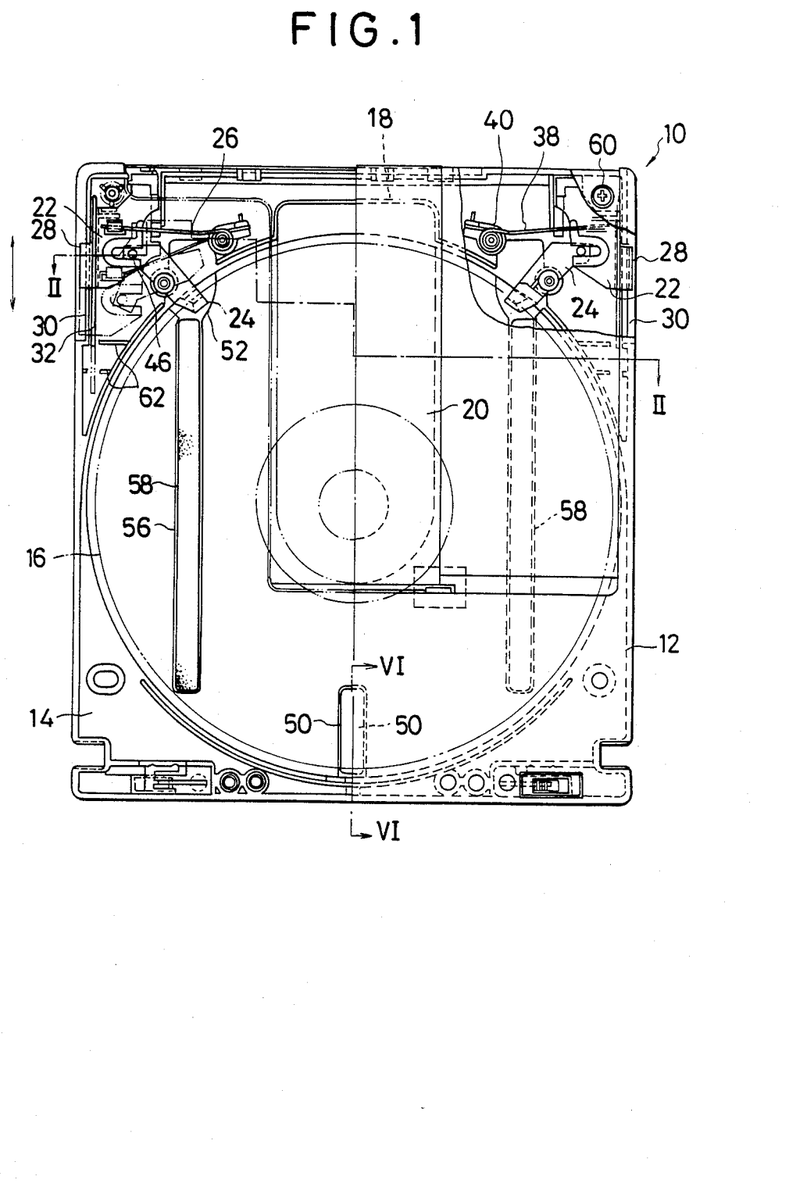
FIG. 1 is partly cutaway plan view showing an embodiment of a disc cartridge according to the present invention.

FIG. 1 shows an embodiment of a disc cartridge according to the present invention.

Figure 2:
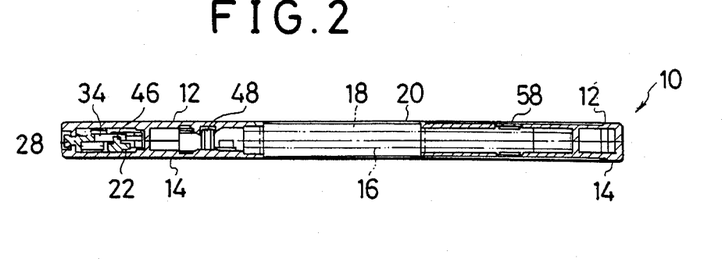
FIG. 2 is a sectional view taken along line II—II of FIG. 1.
Figure 3:
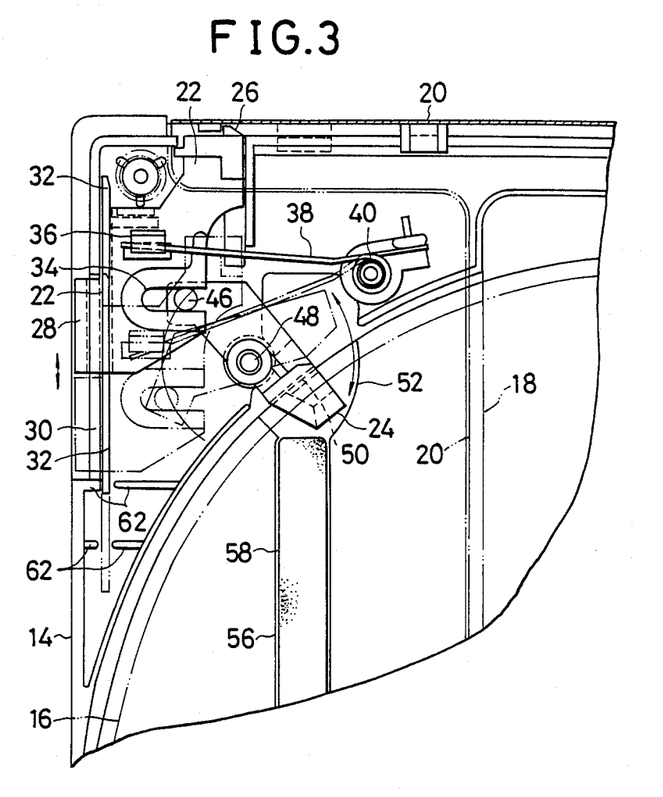
FIG. 3 is partly enlarged view showing an actuating section of the disc cartridge shown in FIG. 1.

A disc cartridge of the illustrated embodiment, as shown in FIG. 1 to 3, includes a casing 10 comprising an upper cover plate 12 and a lower cover plate 14 joined together so as to define a space therein, and a disc 16 received or housed in the casing 10. The casing 10 is formed with at least a window 18 for inserting a disc driving mechanism of a disc player (not shown) therethrough into the casing 10. The window 18 is operated by a shutter 20. Also, the disc cartridge includes a pair of actuators 22 arranged in the casing 10 for releasably locking the shutter 20 and a receiver 24 provided in the casing 10 and operatively connected to or engaged with each of the actuators 22. The disc receiver 24 is adapted to selectively receive a part of a peripheral portion of the disc 16 or a part of each of upper and lower surfaces and a peripheral end surface of the disc 16. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved; so that when the shutter 20 is actuated to close the window 18, the disc receiver 24 may be engaged with the disc 16 or insert therein a part of the disc to force it toward a rear side end of casing 10 while holding it at the center of the casing along a width direction of the casing, to thereby keep it in a state of floating in the space defined in the casing 10, whereas when the shutter 20 is actuated to open the window 18, the disc receiver 24 may be disengaged from the disc 16 to prepare the disc for engagement with a disc driving mechanism of a disc player which is then inserted through the opened window into the cartridge.

In the illustrated embodiment, the shutter 20 comprises a plate member of a substantially U-shape which is movably fitted on the casing 10 so as to be slidable along the upper and lower cover plates 12 and 14.

A pair of the actuators 22, as shown in FIG. 1, are formed to be symmetrical with each other and arranged adjacent to both sides of a front portion of the casing 10 in a manner to be not only opposite to each other but symmetrical along a longitudinal axis of the cartridge and slidable with respect to the casing 10. Also, the actuators each serves as an actuating lever to actuate opertion sections of the disc cartridge. More particularly, each of the actuators 22, as shown in FIG. 3, is provided at a front end thereof with lock means 26, which comprise, in the illustrated embodiment, a hook-like member integrally formed at the front end of the actuator 22 and securely engaged with the shutter 20. The actuator 20 is also provided on one side or an outer side thereof with actuating means 28 which comprises, in the illustrated embodiment, a prejection integrally formed on the outer side of the actuator and outwardly extending through a horizontally extending cutout or slot 30 formed in side wall of the casing 10. Also, the actuator 22 has cover means 32 integrally provided on one side thereof so as to extend in a longitudinal direction thereof. The cover means 32 are formed to thoroughly cover the cutout 30 formed in the side wall of the casing 10 in a sealed manner to function as a dust protective cover for preventing any dust from entering the casing 10 through the cutout 30. In addition, the actuator 22 is formed on the other side or an inner side thereof with a guide groove 34 of a substantially U-shaped which serves as movement transmission means for transmitting sliding movement of the actuator to the disc receiver 24 as described hereinafter. Further, the actuator 22 is provided on an upper surface thereof with a spring bearing 36 as shown in FIG. 3 which is engaged with one end of a spring 38 held at the other end thereof on a spring holder 40 fixed on the casing 10, so that the actuator may be constantly forced toward a front end of the casing.

Figure 4:
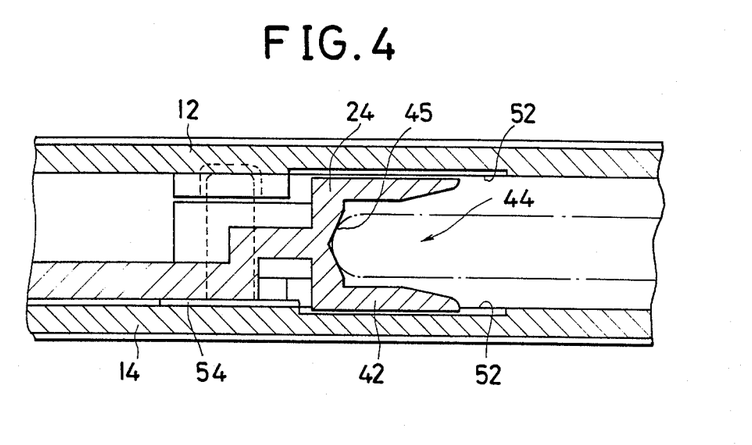
FIG. 4 is a fragmentary sectional view showing a receiver body of a disc receiver.

A pair of the disc receivers 24, as shown in FIG. 1, are also formed in a manner to be symmetrical with each other. Each of the disc receivers 24 is generally formed into a liver-like shape as shown in FIGS. 1 and 3 and provided at one end thereof with a receiver body 42. The receiver body 42 is formed into a substantially sideways U-shape to define therin a recess designated by reference numeral 44 in FIG. 4. The recess 44 is formed at an end surface thereof contacting with a peripheral end portion of the disc 16 into a substantially sideways V-shape of which an apex is positioned at substantially the center of the end surface, as indicated at reference numeral 45. The V-shaped end surface 45 may have applied thereto an elastic member (not shown) to prevent unsteadiness and/or damage of the disc in the disc receiver 24. The elastic member may be formed of rubber or a soft plastic material such as polyethylene, polypropylene or vinyl chloride. Such an elastic member may be arranged on upper and lower surfaces of the recess of the receiver body 42. The recess 44 of the receiver body 42 is preferably formed in a manner such that an opened end portion or inlet portion is vertically enlarged so as to facilitate the insertion and removal of a disc 16 with respect to the recess 44.

Figure 5:
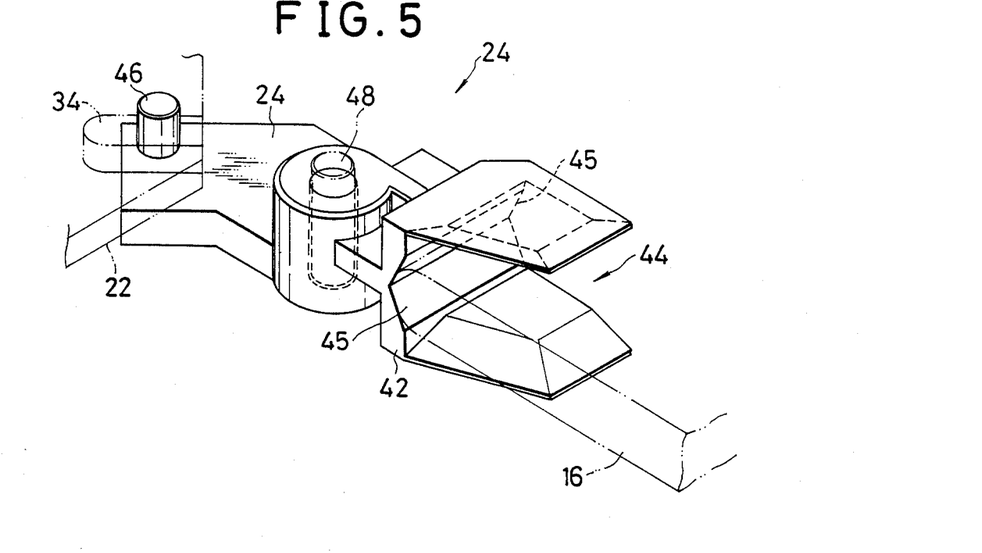
FIG. 5 is a perspective view showing a disc receiver.

The so-formed receiver body 42 is positioned adjacent to a peripheral portion of the disc 16 to selectively receive a part of the peripheral portion in the recess depending upon the sliding movement of the actuator and also act as an elevator for lifting the disc 16. More particularly, the disc receiver 24, as best seen in FIG. 5, is also provided at the other end thereof with a guide pin 46 acting as operative connection means, which is loosely fitted in the guide groove 34 of the actuator 22 to operatively connect the disc receiver 24 to the actuator 22. The disc receiver 24 is movably supported at a middle portion thereof on a pivot pin 48 so as to be rotatable about the pin 48 and veritcally movable along the pin 48.

In the illustrated embodiment, the guide pin 46 is provided at the disc receiver 24 and the guide group groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

Figure 6:
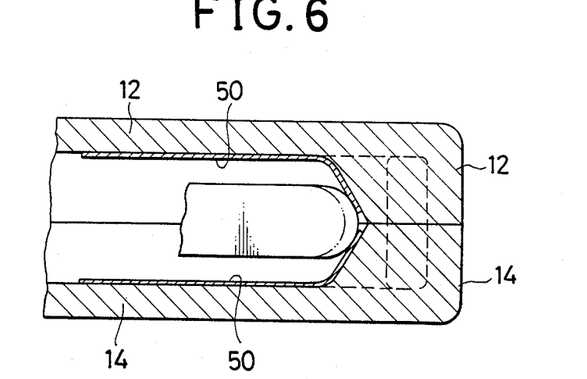
FIG. 6 is a sectional view taken along line VI—VI of FIG. 1.

Further, in the illustrated embodiment, the casing 10 is formed at a rear end thereof into a substantially sideway V-shape as shown in FIG. 6, so that the rear end may be tapered. Such construction facilitates the positioning of the disc 16 at the center of the casing 10 in a width direction of the casing because it is guided along the tapered rear end. This results in the disc 16 being located at positions indicated at two-dot chain lines and solid lines in FIG. 6 when the disc cartridge is charged in a disc player and removed therefrom, respectively. Also, the casing 10 may have a disc holding material 50 applied to the tapered rear end thereof to ensure the safety and smooth operation of the disc in the casing 10. For this purpose, the disc holding material 50 is preferably a material which is capable of exhibiting lubricating properties, such as ultra-high-molecular-weight polyethylene, ultra-high-molecular-weight polyethylene foam, PET, metal sheet such as stainless steel and the like. Such a material likewise may be applied to portions of the casing 10 adjacent to the tapered rear end shown in FIG. 6.

The casing 10, as shown in FIG. 1, is formed on each of upper and lower surface sections of an inner surface thereof with a pair of recesses 52 so as to positionally correspond to the disc receivers 24. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designate a bolt and a rib, respectively.

Now, the manner of operation of the disc cartridge of the illustrated embodiment constructed as described above will be described hereinafter with reference of FIGS. 1 to 7.

When the disc cartridge is inserted in a disc player (not shown) for the operation, the actuating means or projection 28 of the actuator 22 projecting through the cutout 30 of each of the side plates of the casing 10 are/is engaged with a projection provided at an insertion port of the disc player to be rearwardly slided along the cutout 30 against the spring 38. The sliding of the projection 28 causes the shutter 20 of be released from the lock means or hook-like member 26, so that the shutter 20 may be moved in a direction of opening the window 18 means of a shutter actuating mechanism of the disc player. Concurrently, the disc receiver 24 is pivotally moved about the pivot pin 48 due to the sliding of the actuator 22 to release the disc 16 from the recess 44, resulting in the disc 16 being safely supported on the lubricating sticked sheets 58 and then operatively engaged with a disc driving mechanism of the disc player.

Figure 7:
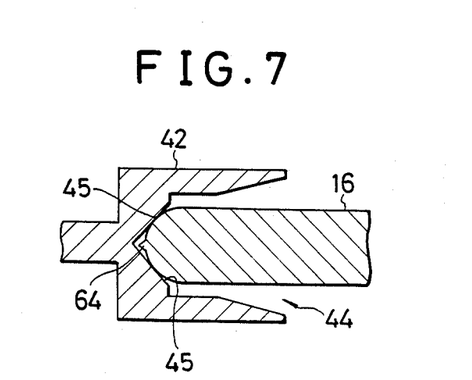
FIG. 7 is a fragmentary sectional view showing the manner of operation of a receiver body of a disc receiver.

When the disc cartridge is to be removed from the disc player, the disc 16 is first disengaged from the disc driving mechanism of the disc player to be put on the lubricating sticked sheets 58 and then the shutter 20 is moved by means of the shutter actutating mechanism of the disc player to close the window 18. Then, the disc cartridge is removed from the disc player, so that the actuator 22 may be slided toward the front end of the disc cartridge by means of the spring 38 to actuate the disc receiver 24, to thereby fit a part of the disc 16 in the receiver body 42. This results in the disc 16 being forced toward the rear end of the casing 10 while being held at a state of floating in the space in the casing 10. Simultaneously, the lock means 26 of the actuator 22 is actuated to keep the shutter 20 closed. In this instance, The disc 16 is safely held in the casing 10, because the outer periphery of the disc, as shown in FIG. 7, is constantly abutted against the sideways V-shaped end surface of the recess 44 of the receiver body 42 even when any obstacle 64 such as burrs or the like is formed at the outer periphery of the disc 16.

As can seen from the foregoing, the present invention is constructed in the manner that the end surface of the recess of the disc receiver contacting with the outer periphery of the disc is formed into a sideways V-shaped of which an apex is positioned at substantially the center of the end surface. Accordingly, the present invention not only forces the disc toward the rear end of the casing while keeping it at the center of the casing in the width direction of the casing when the shutter is actuated to close the window and separated the disc receiver from the disc when the shutter is actuated to open the window but prevents any obstacle formed at the outer periphery of the disc such as an undesired protrusion due to mismatching, burrs or the like from being contacted by the inner surface of the casing. Thus, the present invention prevents a recording surface section of the disc from being contacted by the casing and places the disc at a proper position in the casing without damaging and polluting the disc, to thereby ensure the safe and smooth operation of the disc in the casing. Also, the present invention effectively prevents unsteadiness of the disc in the casing It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising:
    a casing comprising an upper cover plate and a lower cover plate joined together;
    a disc rotatably housed in said casing;
    a shutter for operating at least one window provided in said casing to insert a disc driving mechanism therethrough into said disc cartridge;
    actuator means movably arranged in said casing and engaged with said shutter to releasably lock said shutter; and
    a disc receiver movably arranged in said casing and operatively connected to said actuator means whereby movement of said actuator means in turn moves said disc receiver;
    said disc receiver selectively receiving therein a part of a peripheral portion of said disc and being formed with a recess for receiving said peripheral portion of said disc;
    said recess of said disc receiver having an end surface contacting an outer periphery of said disc which is formed into a substantially sideways V-shape having an apex positioned at substantially a center of said end surface;
    said disc receiver being movably positioned within said casing to retain said disc substantially at a center of said casing between inner surfaces of said upper and lower cover plates in a top-to-bottom direction, when said cartridge is not in use; whereby
    (i) said disc receiver receives the peripheral part of said disc and said is forced towards a rear end of said casing while being kept substantially at the center of said casing in a width direction of said casing by said disc receiver when said shutter is actuated to close said window and said actuator means are moved in a first direction, and
    (ii) said disc receiver is separated from said disc when said shutter is actuated to open said window and said actualor means are moved in a second direction;
    wherein said disc receiver is supported on a pivot pin so as to be rotatable about said pivot pin and axially movable along said pivot pin.

2. A disc cartridge as defined in claim 1, wherein said disc receiver includes a receiver body which is formed into a substantially sideways U-shape to define said release therein, with said substantially V-shsped end surface being positioned at a bottom of said U.

3. The cartridge of claim 1, additionally comprising two said disc receivers, each being movably arranged in said casing and operatively connected to said actuator means, which comprise,
   a pair of actuators, each being slidably arranged within said casing opposite one another and substantially symmetrically along a longitudinal axis of said cartridge.

4. A disc cartridge as define in claim 1, wherein said recess is formed in a manner such that an inlet portion thereof is vertically enlarged,
   whereby insertion or removal of said disc into or out of said disc receiver is facilitated.

5. The cartridge of claim 1, wherein side surfaces of said recess extending outwardly from opposite ends of aid substantially V-shape end surface are substantially parallel.

6. The cartridge of claim 5, wherein said recess is additionally flared outwardly at ends of said substantially parallel side surfaces opposite said substantially V-shaped end surface,
   whereby insertion or removal of said disc into our out of said disc receiver is facilitated.

7. The cartridge of claim 1, wherein said actuating means additionally comprise
   a groove on one side thereof, and
   said disc receiver additionally comprise a guide pin on an end thereof opposite an end comprising said recess,
   said guide pin being loosely received in said groove,
   whereby sliding movement of said actuating means is transmitted into rotational movement of said disc receiver.

8. The cartridge of claim 7, additionally comprising a slot through a side wall of said casing,
   wherein said actuation means comprise a projection slidably disposed within said slot, and
   cover means mounted on an opposite side from said groove, for covering said slot at all times, both during use and nonuse of said cartridge,
   whereby entry of dust into said casing through said slot is prevented.

9. The cartridge of claim 8, additionally comprising
   a spring bearing provided on an upper surface of said actuator means,
   a spring holder fixed on said casing, and
   a spring engaged at one end with said spring bearing and retained at an opposite end by said spring holder, and constantly biasing said actuator means towards a front end of said casing.

10. A disc cartridge comprising:
   a casing comprising an upper cover plate and a lower cover plate joined together;
   a disc rotatably housed in said casing;
   a shutter for operating at least one window provided in said casing to insert a disc driving mechanism therethrough into said disc cartridge;
   actuator means movable arranged in said casing and engaged with said shutter to releasably lock said shutter; and
   a disc receiver movably arranged in said casing and operatively connected to said actuator means whereby movement of said actuator means in turn moves said disc receiver;
   said disc receiver selectively receiving therein a part of a peripheral portion of said disc and being formed with a recess for receiving said peripheral portion of said disc;
   said recess of said disc receiver having an end surface contacting an outer periphery of said disc which is formed into a substantially sideways V-shape having an apex positioned at substantially a center of said end surface;
   said disc receiver being movably positioned within said casing to retain said disc substantially at a center of said casing between inner surfaces of said upper and lower cover plates in a top-to-bottom direction, when said cartridge is not in use; whereby
   (i) said disc receiver receives the peripheral part of said disc and said disc is forced towards a rear end of said casing while being kept substantially at the center of said casing in a width direction of said casing by said disc receiver when said shutter is actuated to close said window and said actuator means are moved in a first direction, and
   (ii) said disc receiver is separated from said disc when said shutter is actuated to open said window and said actuator means are moved in a second direction;
   wherein side surfaces of said recess extending outwardly from opposite ends of said substantially V-shaped end surface are substantially parallel; and
   additionally comprising an elastic member applied on said side surfaces.

11. The cartridge of claim 10, wherein said elastic member is rubber or a soft plastic material.

12. The cartridge of claim 11, wherein said elastic member is polyethylene, polypropylene, or vinyl chloride.

13. A disc cartridge comprising:
   a casing comprising an upper cover plate and a lower cover plate joined together;
   a disc rotatably housed in said casing;
   a shutter for operating at least one window provided in said casing to insert a disc driving mechanism therethrough into said disc cartridge;
   actuator means movably arranged in said casing and engaged with said shutter to releasably lock said shutter; and
   a disc receiver movably arranged in said casing and operatively connected to said actuator means whereby movement of said actuator means in turn moves said disc receiver;
   said disc receiver selectively receiving therein a part of a peripheral portion of said disc and being formed with a recess for receiving said peripheral portion of said disc;
   said recess of said disc receiver having an end surface contacting an outer periphery of said disc which is formed into a substantially sideways V-shape having an apex positioned at substantially a center of said end surface;
   said disc receiver being movably positioned within said casing to retain said disc substantially at a center of said casing between inner surfaces of said upper and lower cover plates in a top-to-bottom direction, when said cartridge is not in use; whereby
   (i) said disc receiver receives the peripheral part of said disc and said disc is forced towards a rear end of said casing while being kept substantially at the center of said casing in a width direction of said casing by said disc receiver when said shutter is actuated to close said window and said actuator means are moved in a first direction, and (ii) said disc receiver is separated from said disc when said shutter is actuated to open said window and said actuator means are moved in a second direction;

additionally comprising an elastic member applied on said substantially V-shaped end surface, to prevent unsteadiness or damage of the disc in said disc receiver.

14. The cartridge of claim 13, wherein said elastic member is rubber or a soft plastic material.

15. The cartridge of claim 14, wherein said elastic member is polyethylene, polypropylene, or vinyl chloride.

16. A disc cartridge comprising:

a casing comprising an upper cover plate and a lower cover plate joined together;

a disc rotatably housed in said casing;

a shutter for operating at least one window provided in said casing to insert a disc driving mechanism therethrough into said disc cartridge;

actuator means movably arranged in said casing and engaged with said shutter to releasably lock said shutter; and a disc receiver movably arranged in said casing and operatively connected to said actuator means whereby movement of said actuator means in turn moves said disc receiver;

said disc receiver selectively receiving therein a part of a peripheral portion of said disc and being formed with a recess for receiving said peripheral portion of said disc;

said recess of said disc receiver having an end surface contacting an outer periphery of said disc which is formed into a substantially sideways V-shaped having an apex positioned at substantially a center of said end surface;

said disc receiver being movably positioned within said casing to retain said disc substantially at a center of said casing between inner surfaces of said upper and lower cover plates in a top-to-bottom direction, when said cartridge is not in use; whereby (i) said disc receiver receives the peripheral part of said disc and said disc is forced towards a rear end of said casing while being kept substantially at the center of said casing in a width direction of said casing by said disc receiver when said shutter is actuated to close said window and said actuator means are moved in a first direction, and (ii) said disc receiver is separated from said disc when said shutter is actuated to open said window and said actuator means are moved in a second direction;

additionally comprising a rear surface of an interior of said casing being tapered between said inner plate surfaces substantially in the shape of a V, whereby positioning of said disc between said plate surfaces is facilitated.

* * * * *